US011165719B2

(12) United States Patent
Heidelberger et al.

(10) Patent No.: US 11,165,719 B2
(45) Date of Patent: Nov. 2, 2021

(54) NETWORK ARCHITECTURE WITH LOCALLY ENHANCED BANDWIDTH

(71) Applicant: INTERNATIONAL BUSINESS MACHINES CORPORATION, Armonk, NY (US)

(72) Inventors: Philip Heidelberger, Cortlandt Manor, NY (US); Craig Brian Stunkel, Bethel, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 218 days.

(21) Appl. No.: 16/439,224

(22) Filed: Jun. 12, 2019

(65) Prior Publication Data
US 2020/0396175 A1 Dec. 17, 2020

(51) Int. Cl.
*H04L 12/947* (2013.01)
*H04L 12/24* (2006.01)

(52) U.S. Cl.
CPC .......... *H04L 49/25* (2013.01); *H04L 41/0896* (2013.01); *H04L 41/12* (2013.01)

(58) Field of Classification Search
CPC ...... H04L 41/0896; H04L 41/12; H04L 49/25
See application file for complete search history.

(56) References Cited

U.S. PATENT DOCUMENTS

| | | | | |
|---|---|---|---|---|
| 2008/0043769 A1* | 2/2008 | Hirai | ...................... | H04L 41/042 370/420 |
| 2014/0025736 A1* | 1/2014 | Wang | .................... | H04L 45/245 709/204 |
| 2014/0032731 A1* | 1/2014 | Lih | ......................... | H04L 41/14 709/223 |
| 2015/0263970 A1* | 9/2015 | Macchiano | ............. | H04L 45/22 709/223 |
| 2019/0014049 A1* | 1/2019 | Nayak | ..................... | H04L 47/32 |

* cited by examiner

*Primary Examiner* — Rina C Pancholi
(74) *Attorney, Agent, or Firm* — F. Chau & Associates, LLC

(57) ABSTRACT

A computer network architecture includes a plurality N of first nodes, each first node having $k_C$ ports to a cluster network, where N and $k_C$ are integers greater than 0; and a local network switch connected to each of the plurality of first nodes, but not to the cluster network. Each first node has $k_L$ ports to the local network switch, where $k_L$ is an integer greater than 0, and any two first nodes in the plurality of first nodes communicate with each other via the local network switch or via the cluster network.

20 Claims, 3 Drawing Sheets

NETWORK ARCHITECTURE WITH LOCALLY ENHANCED BANDWIDTH

TECHNICAL FIELD

Embodiments of the present disclosure are directed to network architectures of computer networks that provide extremely high messaging performance in high-performance computing (HPC) systems.

DISCUSSION OF THE RELATED ART

High-performance computing (HPC) systems are exemplified by leadership platforms at US. Department of Energy (DoE) National Laboratories. Consider a system of computing nodes that are connected to one-another via an interconnection network, which is typically a packet-switched network. In such an installation, multiple jobs can run on the same machine, often at the same time on different nodes of the machine. The jobs may have highly disparate communication patterns and requirements. For example, some jobs may require mostly global bandwidth, i.e., bandwidth to most or all other nodes in the system. Graph analytics is an example of a class of jobs requiring mostly global bandwidth. Other jobs may require high bandwidth communications to only a few "neighboring" nodes. Such jobs are typical in physics applications, in which the application represents how a physical system, in e.g., 3 dimensions, described by partial differential equations evolves over time due to forces applied to the system. Since the strength of such forces declines over distance, often the model can be accurately solved by only considering forces to the "nearest" neighbors over a short time interval.

Hereinbelow, a machine refers to a computer cluster, a node is a single computer in the cluster/machine that is always an endpoint on the network. An N-port switch connects to up to N devices, which may be nodes or other switches. Different network topologies are often better suited for one type of communication than another. For example, fat trees excel at applications requiring global bandwidth. A fat-tree network, or any tree or multi-stage network in general, has some number of levels (rows) of switches that create the network that connects all of the nodes. Fat tree networks can provide full bisection bandwidth for a range of system sizes. For example, if the system is constructed using N-port switches, where N=48 is a typical value, a three-level fat tree can provide full bisection bandwidth when connecting up to $N^3/4$ endpoints, where each endpoint has one link into the network. Here, it is assumed that all links have the same bandwidth, and full bisection means that the network bisection divided by the number of endpoints is equal to the link bandwidth. However, fat trees can be fairly expensive: in a full bisection 3-level fat tree, there are 3 cables and 5 switch ports per endpoint.

Multi-dimensional torus networks are best suited for purely local communications. For example, the IBM Blue Gene (BG) line of supercomputers uses a 3-dimensional torus in Blue Gene/L (BG/L) and BG/P and a 5-dimensional torus in BG/Q. While maximizing local bandwidth, the bisection of a torus is equal to 4/M times the link bandwidth, where M is the length of the longest dimension in the torus. A higher-dimensional torus can decrease M for a given system size, thereby increasing bisection. Torus networks can be much lower in cost than fat trees. For example, the network logic can be placed on the same chip as the computing processors, effectively eliminating the cost of the switches.

SUMMARY

Exemplary embodiments of the present disclosure are directed to a new network topology that can provide full bisection bandwidth and can approximately double the network performance of near neighbor applications without doubling the network cost. Depending on component costs, a network according to an embodiment of the disclosure adds about 30% to the cost of a 3-level fat tree.

According to an embodiment of the disclosure, there is provided a computer network architecture that includes a plurality N of first nodes, each first node having $k_C$ ports to a cluster network, wherein N and $k_C$ are integers greater than 0, and a local network switch connected to each of the plurality of first nodes, but not to the cluster network. Each first node has $k_L$ ports to the local network switch, where $k_L$ is an integer greater than 0, and any two first nodes in the plurality of first nodes communicate with each other via the local network switch or via the cluster network.

According to a further embodiment of the disclosure, the local network switch is a middle-of-the rack switch.

According to a further embodiment of the disclosure, the local network switch is a top-of-the rack switch.

According to a further embodiment of the disclosure, $k_C = k_L$.

According to a further embodiment of the disclosure, $k_C = 2$ and $k_L = 2$.

According to a further embodiment of the disclosure, the plurality of first nodes and the local network switch are located in a same rack.

According to a further embodiment of the disclosure, the network includes a plurality M of second nodes, each second node having $k_S$ ports to the cluster network, and $k_S$ global switches that connect each second node to the cluster network. Each second node has $k_S$ sockets and a single network interface connection (NIC), in which the sockets are connected to each other and each socket is connected to the NIC, and each NIC has $k_S$ ports for connection to each of the global switches.

According to a further embodiment of the disclosure, the network includes a scheduler that assigns jobs to a first node of the plurality N of first nodes or to a second node of the plurality M of second nodes based on a bandwidth requirement of each job.

According to a further embodiment of the disclosure, the cluster network is a network that linearly scales bandwidth.

According to another embodiment of the disclosure, there is provided a computer network architecture that includes a plurality $N_S$ of cluster network switches, where $N_S$ is an integer greater than 0, and each cluster network switch is connected to a cluster network, a plurality $N_N$ of first nodes connected to the cluster network switches, where $N_N$ is an integer greater than 0, and a local network switch connected to each of the plurality of first nodes, but not to the cluster network. Each first node has $k_S$ sockets and $k_N$ network interface controllers (NICs), where each socket is connected to each of the NICs, and the NICs are not connected to each other, where $k_S$ and $k_N$ are integers greater than 0. Each NIC has $k_F$ first ports for connection to the sockets and $k_D$ second ports for connection to the cluster network switches and the local network switches, where $k_F$ and $k_D$ are integers greater than 0, and any two first nodes in said plurality of first nodes communicate with each other via the cluster network switches or the local network switch.

According to a further embodiment of the disclosure, the sockets are connected to each other.

According to a further embodiment of the disclosure, a first NIC of each first node has $k_D$ second ports connected to the local network switch, and at least one second NIC is connected to $k_D$ cluster network switches via each of the $k_D$ second ports.

According to a further embodiment of the disclosure, each NIC of each first node has a first port of the $k_D$ second ports connected to the local network switch, and $(k_D-1)$ other second ports connected to each of $(k_D-1)$ global network switches.

According to a further embodiment of the disclosure, $N_S=2$, $k_S=2$, $k_N=2$, $k_F=2$, and $k_D=2$.

According, to a further embodiment of the disclosure, $N_S=2$, $k_S2$, $k_N=2$, $k_F=2$, and $k_D=2$.

According to a further embodiment of the disclosure, each network switch is a middle-of-the rack switch.

According to a further embodiment of the disclosure, each network switch is a top-of-the rack switch.

According to a further embodiment of the disclosure, the cluster network is a network that linearly scales bandwidth.

According to a further embodiment of the disclosure, the network includes a plurality M of second nodes, each second node having $k_D$ ports to the cluster network, where M and $k_D$ are integers greater than 0, and $k_D$ global switches that connect each second node to the cluster network. Each second node has $k_D$ sockets and a single network interface connection (NIC), in which the sockets are connected to each other and each socket is connected to the NIC, and each NIC has $k_D$ ports for connection to each of the global switches.

According to a further embodiment of the disclosure, the network includes a scheduler that assigns jobs to a first node of the plurality N of first nodes or to a second node of the plurality M of second nodes based on a bandwidth requirement of each job.

DETAILED DESCRIPTION OF EXEMPLARY EMBODIMENTS

Figure 1:
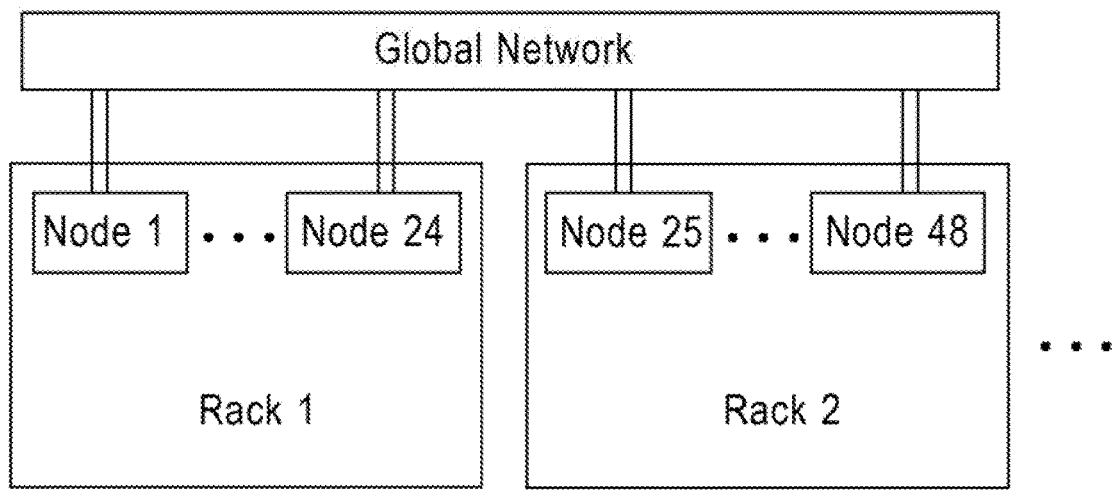
FIG. 1 illustrates a standard global network, with each node having 2 ports into a global network.

Exemplary embodiments of the disclosure as described herein generally provide computer network architecture topologies that can provide full bisection bandwidth and can approximately double the network performance of near neighbor applications. While embodiments are susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure.

A network according to an embodiment of the disclosure can be constructed using N-port switches, for some value of N. An exemplary, non-limiting value for N is N=48, and the figures will be shown based on N=48.

Figure 2:
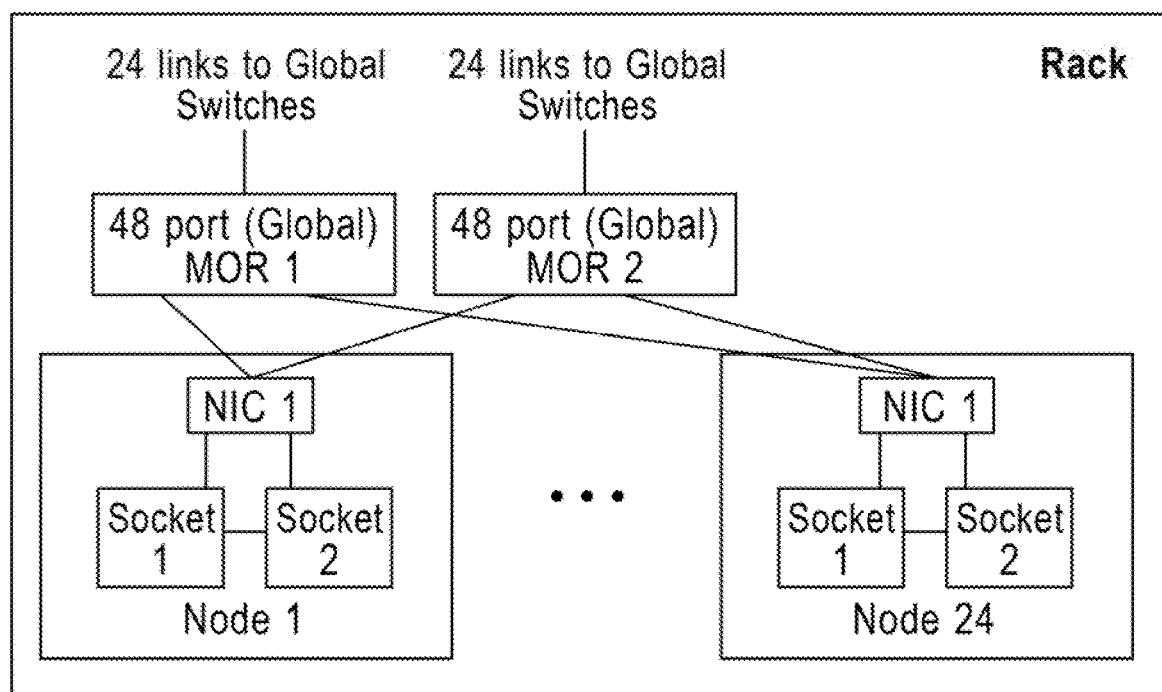
FIG. 2 illustrates another standard global network with one shared NIC per node.

FIG. 1 illustrates a standard global network. In this network, there are a number of nodes that can fit within a rack. The figure shows 24 (N/2) nodes in a rack. Each node has one or more ports into the network. FIG. 1 shows 2 network ports, and links into the network, per node, as would be the case where the node is a 2-way SMP (shared memory multiprocessor) in which there are two computer sockets and a shared memory bus between the sockets. Each socket is connected to a local memory subsystem and may also be connected to accelerators such as GPUs. As shown in FIG. 2, in such a system, there is may one or more network interface cards (NICs) to which the processor(s) connect via a bus such as a PCIe bus. FIG. 2 shows an exemplary situation in which there is one shared NIC per node. The NIC has two ports to the computer sockets and two cables going to the global network. Often, a first stage of a network is packaged inside the same racks as the computer nodes; this first stage would be one or more N-port switches inside the racks, as shown in FIG. 2. Such switches are called Top of Rack (TOR) or Middle of Rack MOW) switches; topology-wise, they are the same thing, and are both used at the bottom (first) level of a switch network. The difference between a TOR and a MOR is the physical positioning of the switch in the rack. Embodiments of the disclosure will be described with reference to a MOR, as it is the much more commonly-used term in the industry. Placing the switches in the middle of the rack minimizes the length of the longest cable in the rack, making it more likely to be a copper cable, rather than an optical cable, at high signaling rates. The MORs then have cables to the rest of the network. For fault tolerance and increased bandwidth, there may be 2 MORs in the rack with one cable from each node to each MOR, as shown in FIG. 2.

Figure 3:
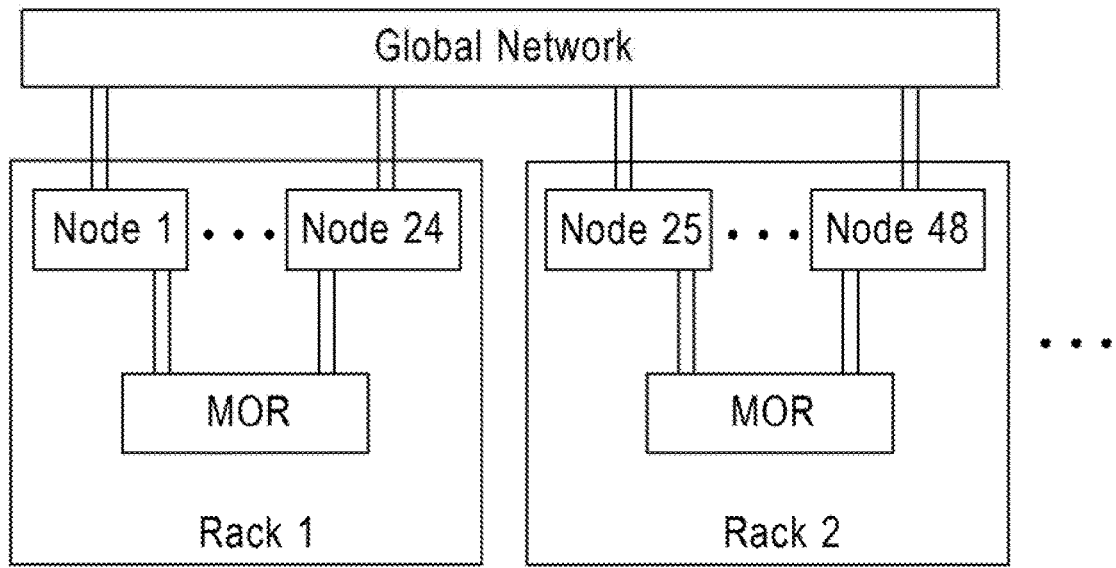
FIG. 3 illustrates a global network with an intra-rack local network according to an embodiment of the disclosure.

A network architecture according to an embodiment of the disclosure is shown in FIG. 3. According to an embodiment of the disclosure, an arbitrary global network is augmented with a high bandwidth local network, as represented by an MOR switch, to which only a small number of "neighboring" nodes are attached. In FIG. 3, for example, each MOR is attached to 24 nodes. The MOR of the local network need not have any ports attached to the global network, although it is possible to reduce the number of neighboring nodes slightly and connect a small number of MOR ports to the global network. FIG. 3 shows a case when there are no such links from the MOR to the global network. In this case, a node can only communicate to those nodes attached to the local network by using the local network. However, two nodes attached to the same local network can use either the local or global network to communicate with one another. Two nodes not attached to the same local network communicate via the global network. A packaging optimization is to attach only those nodes in the same rack to the local network, which can then be implemented as a middle (or top) of rack switch that is placed in the same rack as the nodes. If the MOR switch has N ports, there can be up to N endpoints attached to the local network. In the case of 2-way SMPs, where each socket in the SMP has a link to the local network, there can be up to N/2 nodes attached to the local network. FIG. 3 illustrates an exemplary, non-limiting case with N=48 ports, in which case each of the 48 sockets, in 24 2-way SMPs, in a rack have a link into the local network. FIG. 3 also illustrates a case where each node has two connections to the global network, and two connections to the MOR switch, however, embodiments are not limited thereto. In other embodiments, the number of connections from each node to the global network does not equal to the number of connections from each node to the MOR switch.

Figure 4:
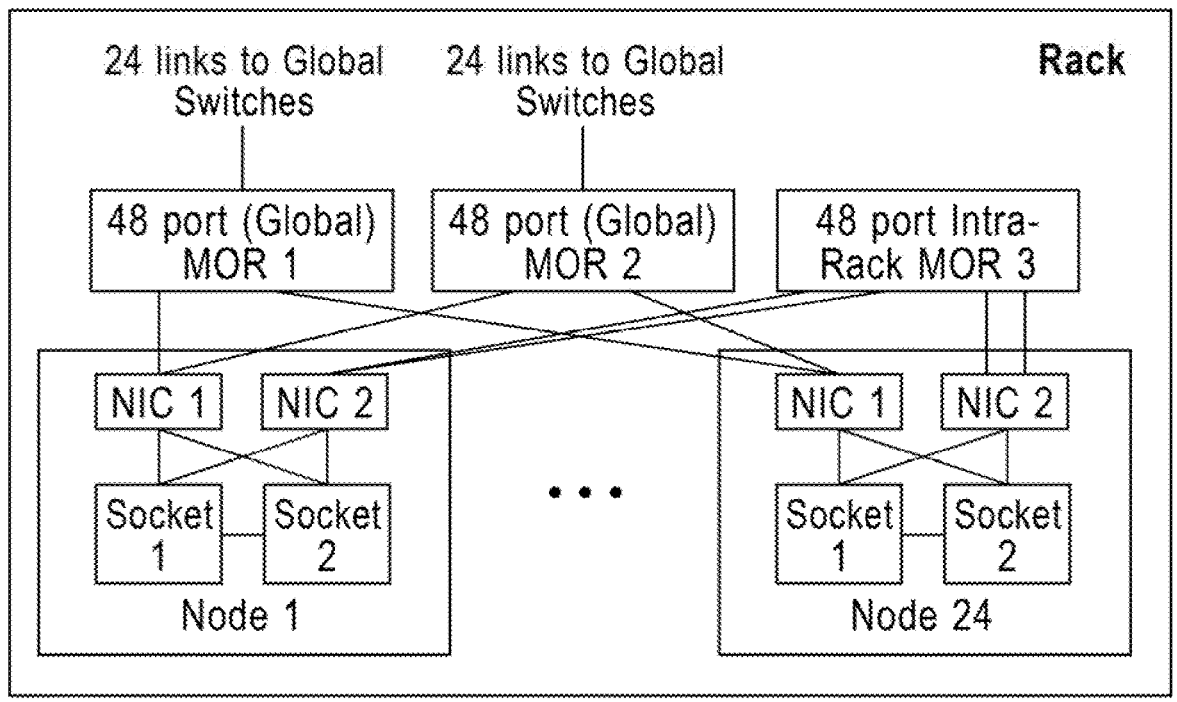
FIG. 4 illustrates a global network with an intra-rack local network with one NIC for global connectivity and one NIC for local connectivity, according to an embodiment of the disclosure.
Figure 5:
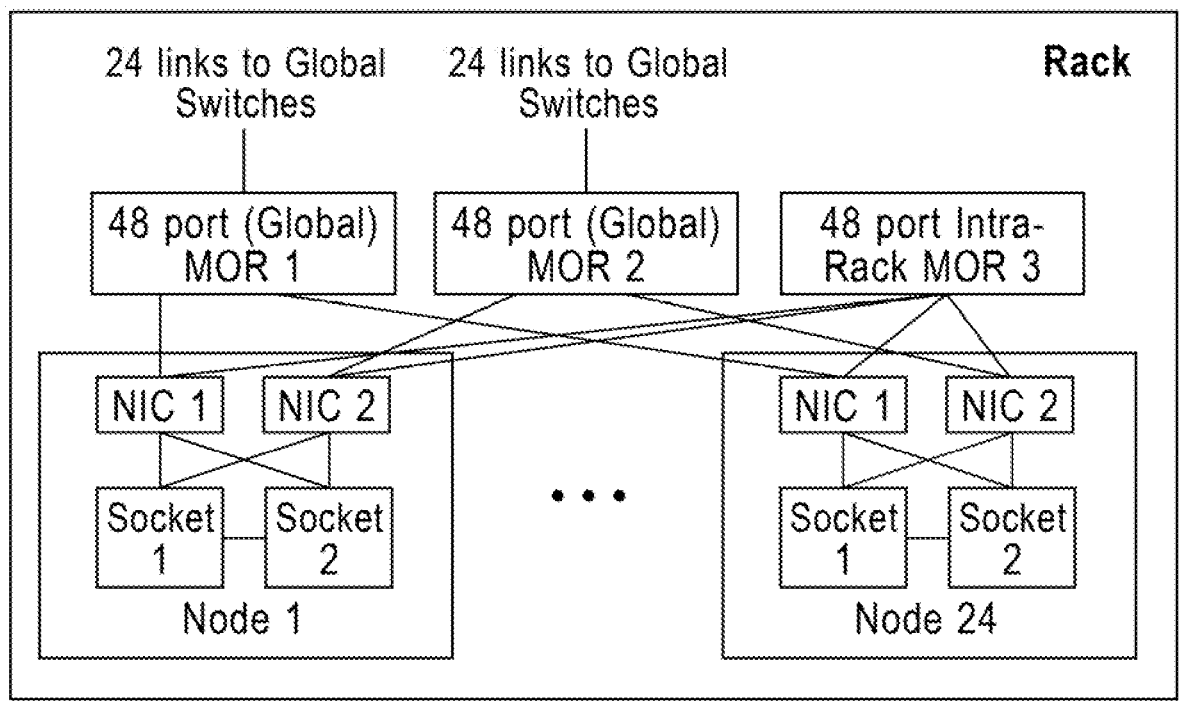
FIG. 5 illustrates a global network with an intra-rack local network with one port to the global network and in which there is one port to the local network from each NIC, according to an embodiment of the disclosure.

FIGS. 4 and 5 illustrate exemplary, non-limiting cases in which each node has 2 sockets and 2 NICs, in which each socket is connected to each of the NICs. In some embodiments, the sockets may be connected to each other. In addition, in each figure, the rack includes 2 MOR switches connected to the global network, in addition to the local network intra-rack MOR. FIG. 4 illustrates a case in which one of the NICs has 2 ports connected to the local network, intra-rack MOR, and the other of the NICs has one port connected to one of the global MOR switches, and a second port connected to the other of the global MOR switches. FIG. 5 illustrates a case in which each of the NICs has one port connected to the local network, intra-rack MOR, and the second port connected to one of the global MOR switches, so that one of the NICs in each node is connected to one of the global MOR switches, and the other NIC in each node is connected to the other global MOR switch. Note that the number of connections illustrated in FIGS. 4 and 5 are exemplary and non-limiting, and the number of connections between the NICs and the global MOR, and between the NICS and the intra-rack MOR can be other than two, and need not be equal to each other. In addition, the number of NICs and sockets per node can differ from two, and need not be equal to each other.

A heterogeneous network for HPC environments according to an embodiment does not need any links from the local network to the global network. However, the switches for local and global connectivity can be identical, although the environment and application needs are different.

Performance Analysis

It will now be shown that using a network architecture according to an embodiment can result in potentially doubling the bandwidth of nearest neighbor communications. In this it is assumed that the global network is a full bisection fat tree, but other topologies with sufficient global bandwidth can be used. Consider a four-dimensional (4D) nearest-neighbor exchange, which is the dominant communication pattern in lattice Quantum Chrome Dynamics (QCD) applications. Here, each message passing interface (MPI) task or process communicates with 8 nearest neighbors, two neighbors in each of four dimensions. For illustrative purposes, assume there is a 2-way SMP and that there are two MPI tasks per socket, or 4 per SMP, although embodiments are not limited thereto. According to embodiments, a 2-way SMP is synonymous with a 2-socket SMP or a 2-chip SMP, where the socket is a physical place for attaching a chip. These are reasonable assumptions if each socket is attached to two GPU accelerators and there is one MPI task per GPU. In addition, it is assumed that the architecture is "well-mapped", meaning that the tasks are assigned in a near-optimal fashion so as to minimize communication. With this, there is a 2×2×1×1 mapping of tasks within a node. The four tasks in each node send a total of 32 messages (4×8), but because of the 2×2×1×2 mapping, each task sends to two other tasks on the same node, and six messages to tasks on different nodes. It is assumed that the on-node bandwidth is much higher than the off-node, network bandwidth and is not the bottleneck. Furthermore, it is assumed that each socket has one network link, and that the network links have a bandwidth of S bytes/sec and the message size is B bytes. The two tasks on a socket send a total of 16 messages of which 12 are sent into the network. With the global network alone, these messages must share the same link into the network, so the communications will take (at least) 12B/S seconds.

Now, consider a network according to an embodiment with locally enhanced bandwidth. It will be shown that less than 50% of the messages exit the local network (rack). Let there be 48-port switches with 24 nodes, 48 sockets per rack. As each socket has 2 tasks, there are 96 tasks within the rack that can be arranged as 4×4×3×2 (=96) local grid. 576 (=6×96) messages enter the network. Considering the faces of the 4×4×3×2 local grid, a total of 2×(4×3×2+4×3×2+4× 4×3+4×4×2)=256 messages exit the rack, representing 44.4% (256/576) of all the network messages. Such messages must use the global network. The total time to send these 256 messages over the 48 global network links exiting the rack is (at least) 256 B/(48 S)=5.33 B/S, which is less than half the time using the global network alone. The remaining 55.6% of the messages can use either the local or the global network. As each socket now has two links into the network, with optimal load balancing, the socket's 12 messages can share two injection links, and can share the extra bandwidth between nodes using both the local and global networks. With perfect load balance, 50% of all traffic would go on each of the socket's two injection links, thus the injection time is (at least) 12 B/(2S)=6B/S, which is half that of the global network alone. Thus, a network architecture according to an embodiment has the potential to double network performance for this application. The actual performance will depend on the efficiency of the load balancing, and the effectiveness of the network to route packets at near peak bandwidth. Fat trees with adaptive routing, or random spraying of packets can deliver near peak bandwidth.

According to an embodiment, consider a 3D nearest-neighbor communication pattern, which is also often found in many physics applications. Under the same assumptions as before, there is a 2×2×1 on-node geometry. Each task sends six messages, two of which remain on-node. The 96 tasks in a rack can be a 6×4×4 grid. There are 384 (=96×4) network messages per rack. The number of messages exiting the rack is 2×(6×4+6×4+4×4)=128. Since only 33.3% (128/384) of the network messages exit the rack, arguing as before, an architecture according to an embodiment has the potential to double network performance for this communication pattern as well.

Extra Cost of Local Network

According to an embodiment, consider a system with 2-way SMPs, and a shared NIC with 2 cables entering the network. If the base global network is a full bisection 3-level fat tree, the cost per endpoint, as measured by the number of components, is:

½ NIC;

5 network ports; and 3 cables. Typically, in a 3-level fat tree, one cable is within a rack from the computer node to the MOR; since the distance is short, it is likely that this can be a cheaper passive copper cable. One cable is to core "director" switches, which are 2-level fat trees; such cables are longer and are more expensive optical cables. One cable is within the director switch, many of which can again be copper.

Referring to FIGS. 3, 4 or 5, according to an embodiment, if a local network is connected through an MOR, then the additional cost of the local network is:

½ a NIC;
1 cable, which is likely a short, cheaper copper cable; and
1 network port.

So, when doubling the number of NICs in a network according to an embodiment, the number of switches increases by only 20%, the number of cables by only 33%, and the added cable is likely a cheaper copper cable. Depending on the relative cost of components, it is expected that the added cost per endpoint to be 25% to 30% of the cost of adding a full additional plane of a 3-level fat tree.

Load Balance

In a performance analysis according to an embodiment, it was observed that effective load balancing of network traffic is needed to approach the 2× performance improvement offered by a network architecture according to an embodiment. In InfiniBand networks, work queue elements (WQEs) that describe a message are posted to queue pairs for processing by the NIC. Each WQE typically describes one message. As there are two NICs per node, there is a cabling choice:

1. Bring two cables from one NIC into the global network, and two cables from the other NIC into the local network, as shown in FIG. 4.
2. Bring one cable from each NIC into the global network, and one cable from each NIC into the local network, as shown in FIG. 5.

In option 1, according to an embodiment, to obtain a good load balance, software would have to allocate exactly the tight number of WQEs to each NIC, and perhaps creating two WQEs for one, long message to get the proper mix. This requires software that understands the communication pattern, and can optimize for it, which is a challenging proposition. This software burden is greatly eased by using option 2, provided that the NIC can make adaptive routing choices, depending on current load conditions. In particular, according to an embodiment, for a message being transmitted outside the rack, the link to the global network must be used. For messages transmitted inside the rack, either link can be chosen, depending on the traffic conditions of the links, and the internal state of the NIC. Current InfiniBand NICs do not support adaptive routing, but this is a desirable feature for a network architecture according to an embodiment Extensions and Further Optimizations To reduce cost, a network architecture according to an embodiment of the disclosure may be incorporated into only a portion of a larger network. In particular, if there are a large number of computer racks, a network architecture according to an embodiment can be incorporated into a percentage, say 20%, of the racks. A scheduler can then assign jobs requiring high local bandwidth to these racks.

Similarly, according to an embodiment, to save network cost, a global network may be, e.g., a half-bisection fat tree. In particular, referring to FIG. 2, with a 48-port switch, there can be up to 24 links from each MOR to the rest of the global network. In a half-bisection fat tree, only 12 such links would be cabled, leaving 12 free. In this case, to achieve the potential doubling of network performance, one could designate a percentage say 20%, of the racks for high bandwidth jobs. In these racks, all 24 links to the global network would be cabled, in addition to adding the local network.

While embodiments of the present disclosure has been described in detail with reference to exemplary embodiments, those skilled in the art will appreciate that various modifications and substitutions can be made thereto without departing from the spirit and scope of the disclosure as set forth in the appended claims.

What is claimed is:

1. A computer network architecture, comprising:
   a cluster network that includes a plurality of clusters, wherein each cluster includes:
   a plurality N of first nodes, wherein N is an integer greater than 1, each first node having $k_C$ ports to the cluster network, wherein $k_C$ is an integer greater than 0; and
   a local network switch connected to each of the plurality of first nodes, but not to the cluster network,
   wherein each first node has $k_L$ ports to the local network switch, wherein $k_L$ is an integer greater than 0,
   wherein any two first nodes in said plurality of first nodes communicate with each other via the local network switch or the cluster network, and
   wherein a node in a first cluster of the plurality of clusters communicates with a node in a second cluster of the plurality of clusters only via the cluster network.

2. The computer network architecture of claim 1, wherein the local network switch is a middle-of-the rack switch.

3. The computer network architecture of claim 1, wherein the local network switch is a top-of-the rack switch.

4. The computer network architecture of claim 1, wherein $k_C = k_L$.

5. The computer network architecture of claim 3, $k_C = 2$ and $k_L = 2$.

6. The computer network architecture of claim 1, wherein the plurality of first nodes and the local network switch are located in a same rack.

7. The computer network architecture of claim 1, further comprising:
   a plurality M of second nodes, each second node having $k_S$ ports to the cluster network, and $k_S$ global switches that connect each second node to the cluster network,
   wherein each second node has $k_S$ sockets and a single network interface connection (NIC), in which, the sockets are connected to each other and each socket is connected to the NIC, and each NIC has $k_S$ ports for connection to each of the global switches.

8. The computer network architecture of claim 7, further comprising
   a scheduler that assigns jobs to a first node of the plurality N of first nodes or to a second node of the plurality M of second nodes based on a bandwidth requirement of each job.

9. The computer network architecture of claim 1, wherein the cluster network is a network that linearly scales bandwidth.

10. A computer network architecture, comprising:
    a cluster network that includes a plurality of clusters, wherein each cluster includes:
    a plurality $N_S$ of cluster network switches, wherein $N_S$ is an integer greater than 1, wherein each cluster network switch is connected to the cluster network;
    a plurality $N_N$ of first nodes connected to the cluster network switches, wherein $N_N$ is an integer greater than 1; and
    a local network switch connected to each of the plurality of first nodes, but not to the cluster network,
    wherein each first node has $k_S$ sockets and $k_N$ network interface controllers (NICs),
    wherein each socket is connected to each of the NICs, and the NICs are not connected to each other,
    wherein $k_S$ and $k_N$ are integers greater than 0, and each NIC has $k_F$ first ports for connection to the sockets and $k_D$ second ports for connection to the cluster network switches and the local network switch, wherein $k_F$ and $k_D$ are integers greater than 0, wherein any two first nodes in said plurality of first nodes communicate with each other via the cluster network switches or the local network switch, and wherein a node in a first cluster of the plurality of clusters communicates with a node in a second cluster of the plurality of clusters only via the cluster network.

11. The computer network architecture of claim 10, wherein the sockets are connected to each other.

12. The computer network architecture of claim 11, wherein $N_S=2$, $k_S=2$, $k_N=2$, $k_F=2$, and $k_D=2$.

13. The computer network architecture of claim 10, wherein a first NIC of each first node has the $k_D$ second ports connected to the local network switch, and at least one second NIC is connected to $k_D$ cluster network switches via each of the $k_D$ second ports.

14. The computer network architecture of claim 13, wherein $N_S=2$, $k_S=2$, $k_N=2$, $k_F=2$, and $k_D=2$.

15. The computer network architecture of claim 10, wherein each NIC of each first node has a first port of the $k_D$ second ports connected to the local network switch, and $(k_{D-1})$ other second ports connected to each of $(k_{D-1})$ global network switches.

16. The computer network architecture of claim 10, wherein each network switch is a middle-of-the rack switch.

17. The computer network architecture of claim 10, wherein each network switch is a top-of-the rack switch.

18. The computer network architecture of claim 10, wherein the cluster network is a network that linearly scales bandwidth.

19. The computer network architecture of claim 10, further comprising:

a plurality M of second nodes, each second node having $k_D$ ports to the cluster network, wherein M and $k_D$ are integers greater than 0; and $k_D$ global switches that connect each second node to the cluster network, wherein each second node has $k_D$ sockets and a single network interface connection (NIC) in which the sockets are connected to each other and each socket is connected to the NIC, and each NIC has $k_D$ ports for connection to each of the global switches.

20. The computer network architecture of claim 19, further comprising a scheduler that assigns jobs to a first node of the plurality $N_N$ of first nodes or to a second node of the plurality M of second nodes based on a bandwidth requirement of each job.

* * * * *